United States Patent Office 3,839,370
Patented Oct. 1, 1974

3,839,370
ALIPHATIC DIOLEFINIC ACIDS AND ESTERS
AND DERIVATIVES THEREOF
Clive A. Henrick, Palo Alto, Calif., assignor to Zoecon Corporation, Palo Alto, Calif.
No Drawing. Filed Nov. 30, 1972, Ser. No. 310,749
Int. Cl. C08h 17/44
U.S. Cl. 260—404   10 Claims

ABSTRACT OF THE DISCLOSURE

Aliphatic substituted diolefinic acids and esters, and derivatives thereof, intermediates therefor, synthesis thereof and the control of insects.

---

This invention relates to novel aliphatic diolefinic compounds, intermediates therefor, synthesis thereof and the control of insects. Most particularly, the novel olefinic compounds of the present invention are represented by the following formula A:

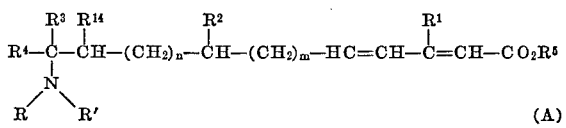

wherein, $m$ is zero or the positive integer one;
$n$ is the positive integer one or two;
each of R and R' is hydrogen or lower alkyl;
each of $R^1$, $R^2$, $R^3$ and $R^4$ is lower alkyl;
$R^{14}$ is hydrogen or methyl; and
$R^5$ is hydrogen, lower alkyl, cycloalkyl, lower alkenyl or lower alkynyl.

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 μg. to 10 μg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula A. Generally, a concentration of less than 25% of the active compound is employed. The formulations can include insect attractants, emulsifying agents or wetting agents to assist in the application and effectiveness of the active ingredient.

In the application of the compounds, there is generally employed a mixture of the C-2,3-trans and cis isomers, the C-2,3 and C-2,4 trans, trans isomer being the preferred embodiment for the control of insects.

In the description hereinafter each of R–$R^5$, $R^{14}$, and $m$ is as defined above.

The compounds of the present invention can be prepared as outlined below:

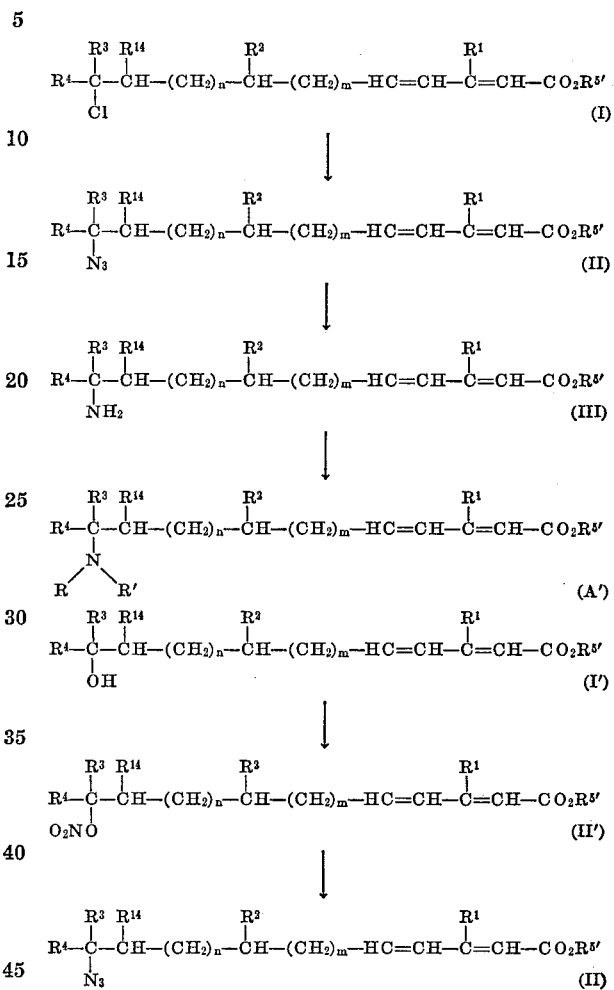

In the above formulas, $R^{5'}$ is lower alkyl.

In the practice of the above outlined synthesis, an azide of formula III is prepared from the corresponding chloride I by treatment with sodium azide, lithium azide, and the like, in an organic solvent inert to the reaction such as dimethylformamide, hexamethylphosphoric triamide or similar solvents.

Alternatively, the azide of formula III can be prepared from the corresponding hydroxy compound I' by nitration as described by A. Michael et al., *J. Amer. Chem. Soc., 57*, 1268 (1935), and treatment of the nitrate with lithium azide, sodium azide, and the like in an organic solvent inert to the reaction such as dimethylformamide or similar solvents, *Agnew Chem. Int. Edt., 10*, (1971), p. 412.

The azide of formula III is reduced to the amine of formula A' (R and R' is hydrogen) using hydrazine hydrate and Raney nickel in ethanol following the procedure described by R. D. Guthrie et al., *J. Chem. Soc.* 5288 (1963) and K. Ponsold, *Chem. Ber., 97*, 3524 (1964).

The secondary and tertiary amines of formula A' are prepared from the primary amines of formula A' described hereinabove with alkyl halides, such as methyl iodide, ethyl bromide, i-butyl iodide, and the like, in an organic solvent inert to the reaction such as benzene, methanol, ether or similar solvents, in the presence of a base such as sodium bicarbonate, potassium carbonate, or the like.

The esters of formula A' are converted into the corresponding acids by hydrolysis with base, such as potassium carbonate or sodium carbonate in organic solvent, such as methanol or ethanol. Other esters of the present invention can be prepared by transesterification or conversion of the acid into the acid halide by treatment with thionyl chloride, oxalyl chloride, or the like, and then reacting the acid halide with the alcohol corresponding to the ester moiety desired.

The percursors of formula I and I' can be prepared as described in application Ser. No. 196,800, filed Nov. 8, 1971, now U.S. Pat. 3,732,282, the disclosure of which is incorporated by reference.

The term "lower alkyl," as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "cycloalkyl," as used herein, refers to a cyclic alkyl group containing three to eight carbon atoms, e.g. cyclopropyl, cyclopentyl and cyclohexyl.

The term "lower alkenyl," as used herein, refers to an ethylenically unsaturated hydrocarbon group, branched or straight chain, having a chain length of two to six carbon atoms, e.g., allyl, vinyl, 3-butenyl, 2-hexenyl and i-propenyl.

The term "lower alkynyl," as used herein, refers to an acetylenically unsaturated hydrocarbon group, branched or straight chain, having a chain length of three to six carbon atoms, e.g. 2-propynyl, 3-pentynyl, etc.

The following examples are provided to illustrate the practice of the present invention. Temperatures are given in degrees Centigrade.

EXAMPLE 1

To 10 g. methyl 11-chloro-3,7,11-trimethyldodeca-2,4-dienoate in 120 ml. of dimethylformamide under argon is added 3 g. of sodium azide and the mixture is heated at 100° for 24 hr. Let cool. After pouring the mixture into water and extracting with pentane-ether (9:1), the organic fractions are washed with brine, dried over magnesium sulfate and evaporated to yield methyl 11-azido-3,7,11-trimethyldodeca-2,4-dienoate.

EXAMPLE 2

Following the procedure of Example 1 each of the chloro compounds under Column I is treated with sodium azide to produce the corresponding azido compounds under Column II

I methyl 11-chloro-3,7,11-trimethyltrideca-2,4-dienoate;
ethyl 11-chloro-3,7-dimethyl-11-ethyltrideca-2,4-dienoate;
ethyl 11-chloro-3,11-dimethyl-7-ethyltrideca-2,4-dienoate;
methyl 11-chloro-3,7,10,11-tetramethyldodeca-2,4-dienoate;
ethyl 11-chloro-3,7,10,11-tetramethyltrideca-2,4-dienoate;
ethyl 11-chloro-3,10,11-trimethyl-7-ethyltrideca-2,4-dienoate;
ethyl 11-chloro-3,10-dimethyl-7,11-diethyltrideca-2,4-dienoate;
methyl 10-chloro-3,7,10-trimethylundeca-2,4-dienoate;
ethyl 10-chloro-3,10-dimethyl-7-ethyldodeca-2,4-dienoate;
ethyl 10-chloro-3,6,10-trimethyldodeca-2,4-dienoate;
methyl 10-chloro-3,7,9,10-tetramethyldodeca-2,4-dienoate;
methyl 10-chloro-3,6,9,10-tetramethyldodeca-2,4-dienoate;
ethyl 9-chloro-3,6,9-trimethylundeca-2,4-dienoate.

II methyl 11-azido-3,7,11-trimethyltrideca-2,4-dienoate;
ethyl 11-azido-3,7-dimethyl-11-ethyltrideca-2,4-dienoate;
ethyl 11-azido-3,11-dimethyl-7-ethyltrideca-2,4-dienoate;
methyl 11-azido-3,7,10,11-tetramethyldodeca-2,4-dienoate;
ethyl 11-azido-3,7,10,11-tetramethyltrideca-2,4-dienoate;
ethyl 11-azido-3,10,11-trimethyl-7-ethyltrideca-2,4-dienoate;
ethyl 11-azido-3,10-dimethyl-7,11-diethyltrideca-2,4-dienoate;
methyl 10-azido-3,7,10-trimethylundeca-2,4-dienoate;
ethyl 10-azido-3,10-dimethyl-7-ethyldodeca-2,4-dienoate;
ethyl 10-azido-3,6,10-trimethyldodeca-2,4-dienoate;
methyl 10-azido-3,7,9,10-tetramethyldodeca-2,4-dienoate;
methyl 10-azido-3,6,9,10-tetramethyldodeca-2,4-dienoate;
ethyl 9-azido-3,6,9-trimethylundeca-2,4-dienoate.

EXAMPLE 3

A cooled solution of 3.2 g. of nitric acid in 5 ml. of chloroform is slowly added to a solution of 7.5 g. methyl 11-hydroxy-3,11-dimethyl - 7 - ethyltrideca-2,4-dienoate in 25 ml. of chloroform, cooled to −30°. The mixture is stirred for 30 minutes keeping the temperature below −20°, poured into ice-cold sodium bicarbonate solution, extracted with methylene chloride, washed with brine, dried and evaporated to yield methyl 11-nitrato-3,11-dimethyl-7-ethyltrideca-2,4-dienoate (II'; each of $R^1$, $R^3$ and $R^{5'}$ is methyl, each of $R^2$ and $R^4$ is ethyl, $R^{14}$ is hydrogen, $m$ is one, $n$ is two).

Similarly, using the foregoing process, there is prepared:

methyl 11-nitrato-3,7,11-trimethyldodeca-2,4-dienoate,
ethyl 11-nitrato-3,7,11-trimethyltrideca-2,4-dienoate,
ethyl 11-nitrato-3,7-dimethyl-11-ethyltrideca-2,4-dienoate,
methyl 11-nitrato-3,7,10,11-tetramethyltrideca-2,4-dienoate,
methyl 10-nitrato-3,10-dimethyl-7-ethyldodeca-2,4-dienoate,
methyl 10-nitrato-3,6,10-trimethyldodeca-2,4-dienoate.

EXAMPLE 4

3.5 g. methyl 11-nitrato-3,11-dimethyl - 7 - ethyltrideca-2,4-dienoate and 1.5 equivalent lithium azide are stirred in 50 ml. dimethylformamide for 24 hours at room temperature. After dilution with water and extraction with ether, the ethereal extracts are washed with brine, dried over magnesium sulfate and evaporated to yield methyl 11-azide-3,11-dimethyl-7-ethyltrideca-2,4-dienoate.

Using the foregoing procedure, the nitrates of Example 3 are treated with lithium azide to give the corresponding azidoesters.

EXAMPLE 5

To 6.4 g. methyl 11-azido-3,11-dimethyl-7-ethyltrideca-2,4-dienoate in 300 ml. of ethanol under argon is added 20 ml. of 85% hydrizine hydrate and 2 g. of Raney nickel. After stirring for 3 hours at room temperature, the catalyst is filtered off, and ether and saturated sodium chloride are added to the filtrate. The organic phase is washed with brine, dried and evaporated to yield methyl 11-amino-3,11-dimethyl-7-ethyltrideca-2,4-dienoate.

Similarly the azido compounds of Example 2 are reduced to the corresponding amines under Column III:

III methyl 11-amino-3,7,11-trimethyldodeca-2,4-dienoate
methyl 11-amino-3,7,11-trimethyltrideca-2,4-dienoate
ethyl 11-amino-3,11-dimethyl-7-ethyltrideca-2,4-dienoate
methyl 11-amino-3,7,10,11-tetramethyldodeca-2,4-dienoate
ethyl 11-amino-3,7,10,11-tetramethyltrideca-2,4-dienoate
ethyl 11-amino-3,10,11-trimethyl-7-ethyltrideca-dienoate
ethyl 11-amino-3,10-dimethyl-7,11-diethyltrideca-2,4-dienoate
methyl 10-amino-3,7,10-trimethylundeca-2,4-dienoate
ethyl 10-amino-3,10-dimethyl-7-ethyldodeca-2,4-dienoate
ethyl 10-amino-3,6,10-trimethyldodeca-2,4-dienoate
methyl 10-amino-3,7,9,10-tetramethyldodeca-2,4-dienoate
methyl 10-amino-3,6,9,10-tetramethyldodeca-2,4-dienoate
ethyl 9-amino-3,6,9-trimethylundeca-2,4-dienoate

EXAMPLE 6

3 g. of methyl 11-amino-3,7,11-trimethyldodeca-2,4-dienoate in 20 ml. of benzene is added to a suspension of 1 equivalent sodium bicarbonate and 1 equivalent ethyliodide in 10 ml. of benzene. After stirring the mixture at room temperature for about 3 hours, methylene chloride is added and the mixture washed with brine, dried over sodium sulfate and evaporated to yield methyl 11-ethyl-amino-3,7,11-trimethyldodeca-2,4-dienoate.

Other N-mono substituted amines of formula A' (R is hydrogen, R' is lower alkyl) are prepared by using an alkyl halide of the formula R—X (R is lower alkyl, X is chloro, bromo or iodo) such as methyl iodide, butylbromide and the like in place of ethyl iodide.

The process of this example is repeated using the amines of Example 5 with an alkyl halide such as ethyl iodide, methyl iodide, butylbromide or the like to prepare the corresponding amines such as methyl 11-ethylamino-3,11-dimethyl-7-ethyltrideca-2,4-dienoate; methyl 11-methyl-amino-3,11-dimethyl-7-ethyltrideca-2,4-dienoate, ethyl 11-ethylamino-3,7,11-trimethyltrideca-2,4-dienoate, isopropyl 11-methylamino-3,7,11-trimethyldodeca-2,4-dienoate.

EXAMPLE 7

By use of the process of Example 6 with 2 equivalents each of sodium bicarbonate and alkylhalide, N-disubstituted amines of formula A' (R=R'=lower alkyl) are prepared such as methyl 11-diethylamino-3,7,11-trimethyldodeca-2,4-dienoate, methyl 11-diethylamino-3,11-dimethyl-7-ethyltrideca-2,4-dienoate, ethyl 11-dimethylamino-3,7,11-trimethyltrideca-2,4-dienoate, isopropyl 11-dimethylamino-3,7,11-trimethyldodeca-2,4-dienoate, etc.

EXAMPLE 8

By use of the process of Example 6 with a N-monosubstituted amine and 1 equivalent each of sodium bicarbonate and alkyl halide, N-disubstituted amines of formula A' (R and R' are each lower alkyl) are prepared, e.g. methyl 11-methylethylamino-3,7,11 - trimethyldodeca-2,4-dienoate, methyl 11 - methylbutylamino-3,11-dimethyl-1-ethyltrideca-2,4-dienoate, etc.

EXAMPLE 9

1 g. of methyl 11-diethylamino-3,7,11-trimethyldodeca-2,4-dienoate, 60 ml. of methanol, 0.5 g. of sodium hydroxide and 6 ml. of water is stirred at about 30° for 3 days. The mixture is then diluted with water, neutralized and extracted with ether. The organic phase is washed, dried over sodium sulfate and evaporated to yield 11-diethyl-amino-3,7,11-trimethyldodeca-2,4-dienoic acid.

Similarly other aminoesters of formula A' prepared in the Examples 5, 6, 7 and 8 give the corresponding acids.

EXAMPLE 10

1 g. of thionyl chloride is added with stirring at room temperature to 0.5 g. of 11-diethylamino-3,7,11-trimethyl-dodeca-2,4-dienoic acid in ether and stirred for about one hour. Excess thionyl chloride and ether is removed by evaporation. Then fresh ether and 2 equivalents isopropyl alcohol are added and the mixture is heated at about 50° for about five minutes. Excess alcohol is removed by evaporation to yield isopropyl 11-diethylamino-3,7,11-trimethyldodeca-2,4-dienoate which is purified by chromotography.

Similarly by using other alcohols such as cyclopropyl alcohol, n-pentanol, t-butanol, 3-butenyl alcohol, 2-propynyl alcohol or i-propenyl alcohol, the corresponding esters are prepared, that is, cyclopropyl 11-diethylamino-3,7,11-trimethyldodeca-2,4-dienoate,
n-pentyl 11-diethylamino-3,7,11-trimethyldodeca-2,4-dienoate,
t-butyl 11-diethylamino-3,7,11-trimethyldodeca-2,4-dienoate,
3'-butenyl 11-diethylamino-3,7,11-trimethyldodeca-2,4-dienoate,
prop-2'-yn-1'-yl 11-diethylamino-3,7,11-trimethyldodeca-2,4-dienoate,
i-propenyl 11-diethylamino-3,7,11-trimethyldodeca-2,4-dienoate.

EXAMPLE 11

Following the procedure of Example 10, each of the acids of formula A (prepared by the process of Example 9) is converted into the acid halide and then reacted with isopropanol to prepare the respective isopropyl ester.

What is claimed is:

1. A compound selected from those of the formula A:

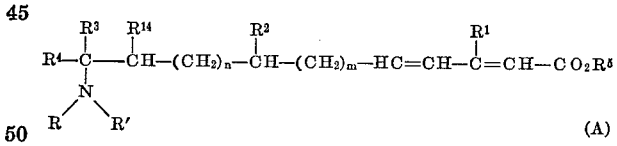

(A)

wherein, $m$ is zero or the positive integer one;
$n$ is the positive integer one or two;
each of R and R' is hydrogen or lower alkyl;
each of $R^1$, $R^2$, $R^3$, $R^4$ is lower alkyl;
$R^{14}$ is hydrogen or methyl; and
$R^5$ is hydrogen, lower alkyl, cycloalkyl, lower alkenyl or lower alkynyl.

2. A compound according to Claim 1 wherein $R^5$ is hydrogen, lower alkyl or lower alkynyl; $m$ is one; and $n$ is two.

3. A compound according to Claim 2 wherein R and R' is hydrogen, methyl or ethyl.

4. A compound according to Claim 3 wherein each of $R^1$, $R^2$, $R^3$ and $R^4$ is methyl or ethyl.

5. A compound according to Claim 4 wherein each of $R^1$, $R^2$, $R^3$ and $R^4$ is methyl; and $R^{14}$ is hydrogen.

6. A compound according to Claim 5 wherein $R^5$ is lower alkyl.

7. A compound according to Claim 4 wherein $R^1$ and $R^4$ is methyl and $R^2$ and $R^3$ is methyl; $R^5$ is lower alkyl; and $R^{14}$ is hydrogen.

8. A compound according to Claim 4 wherein each of $R^1$, $R^2$ and $R^3$ is methyl; $R^4$ is ethyl; $R^{14}$ is hydrogen; and $R^5$ is lower alkyl.

9. A compound according to Claim 6 wherein $R^5$ is ethyl or isopropyl.

10. A compound according to Claim 8 wherein $R^5$ is ethyl or isopropyl.

References Cited

UNITED STATES PATENTS

| | | | |
|---|---|---|---|
| 3,666,780 | 5/1972 | Calame et al. | 260—405 |
| 3,706,733 | 12/1972 | Henrick et al. | 260—327 |

FOREIGN PATENTS

| | | | |
|---|---|---|---|
| 778,214 | 1/1972 | Belgium | 260—413 |

OTHER REFERENCES

C.A. 54–288i.

ELBERT L. ROBERTS, Primary Examiner

E. G. LOVE, Assistant Examiner

U.S. Cl. X.R.

260—349, 408, 410, 410.9, 413; 424—298, 314